United States Patent

[11] 3,609,013

[72] Inventor: Motoaki Kawazu, Tokyo, Japan
[21] Appl. No.: 22,798
[22] Filed: Mar. 26, 1970
[45] Patented: Sept. 28, 1971
[73] Assignee: Kabushiki Kaisha Ricoh, Tokyo, Japan
[32] Priority: Mar. 29, 1969
[33] Japan
[31] 44/24,126

[54] SYMMETRICAL FOUR-COMPONENT PHOTOCOPYING LENS SYSTEM
1 Claim, 3 Drawing Figs.

[52] U.S. Cl. .................................................. 350/220
[51] Int. Cl. ................................................... G02b 9/58
[50] Field of Search ...................................... 350/220

[56] References Cited
UNITED STATES PATENTS
3,221,601  12/1965  Betensky et al. ............ 350/220 X Primary Examiner—John K. Corbin
Attorney—Burgess, Ryan and Hicks ABSTRACT: A holosymmetrical photocopying lens system with a field angle of 53° and an aperture ratio of 1 : 4.5 is provided. Within the range from $c$-line (565.3 m$\mu$) to $g$-line (435.8 m$\mu$), both of the spherical aberration and astigmatism are well corrected with a resolution of 20 lines/mm.

SYMMETRICAL FOUR-COMPONENT PHOTOCOPYING LENS SYSTEM

BACKGROUND OF THE INVENTION

The present invention relates to generally a lens system and more particularly a photocopying lens system best suited for magnification of unity.

The lens system for photocopying machines is required to focus an image having less distortion, to have a precise image an efficient aperture for obtaining a uniform illumination over the whole image plane, a planar image plane because the copy paper or the like is flat, less aberrations such a coma flare, etc., a wide angle so as to enable the photocopying machine to be made compact in size, and a small $f$-number so as to facilitate the photocopying efficiency and to be made of a glass material not absorbing the lights of short wavelength for consideration of the spectral transmission factor because the sensitivity of a photosensitized member used in photocopying is in the range of the spectrum of the light of short wavelength.

It is well known in the art that holosymmetrical lenses are best suited for photocopying with unit magnification. That is distortion can be eliminated, the chromatic difference of manification (lateral chromatic aberration) along the major optical axis is zero and coma flare becomes symmetrical, thereby focusing a better image. Therefore, when a holosymmetrical lens system is employed for photocopying, the design of lenses is limited only to the correction of spherical aberration, astigmatism, curvature of field, chromatic error and coma flare caused by the decreased vignetting.

SUMMARY OF THE INVENTION

It is therefore an object of the present invention to provide an improved photocopying lens satisfying the above-described requirements for focusing a better image and increasing the efficiency of a photocopying machine.

In accordance with the present invention a good holosymmetrical photocopying lens system for photocopying machine is provided, which has a field angle of 53°, an aperture ratio of 1:4.5 and the well-corrected spherical aberration and astigmatism with a resolution of 20 lines/mm.

The above and other objects, features and advantages of the present invention will become more apparent from the following description of one illustrative embodiment thereof with reference to the accompanying drawing.

DESCRIPTION OF THE PREFERRED EMBODIMENT

Figure 1:
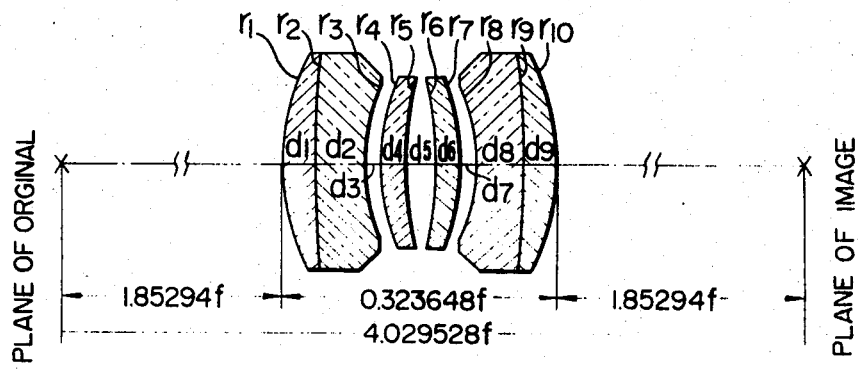
FIG. 1 is a diagrammatic view of a holosymmetrical lens system in accordance with the present invention for photocopying at a magnification of unity.

In a holosymmetrical photocopying lens shown in FIG. 1, reference character $r$ with a numerical subscript designates a radius of curvature of a free surface or cemented surface identified by the subscript; $d$ with a numerical subscript, a distance or thickness of a lens of airspace identified by the subscript; $n$ with a numerical subscript, a refractive index by $d$-line of a lens identified by the subscript; $v$ with a numerical subscript, an Abbe number of a lens identified by the subscript; and $f$, a focal length of the lens system.

In order to provide a holosymmetric photocopying lens system with an aperture ratio of 1:4.5 and angle of view of 53°, the following conditions must be satisfied:

$r_1=(-r_{10})=+0.284724f$=
$r_2=(-r_9)=2.017807f$
$r_3=(-r_8)=0.208707f$
$r_4=(-r_7)=0.298009f$
$r_5=(-r_6)=0.449099f$
$d_1=d_9=0.038625f$
$d_2=d_8=0.056605f$
$d_3=d_7=0.0183130f$
$d_4=d_6=0.024640f$
$d_5=0.047282f$
$n_1=n_6=1.717$
$n_2=n_5=1.62588$
$n_3=n_4=1.68578$
$V_1=V_6=47.9$
$V_2=V_5=35.6$
$V_3=V_4=44.0$

For example, when $f=150$, they are as follows:

| | |
|---|---|
| $r_1=(-r_{10})=42755$ | $d_1=d_9=58$ |
| $r_2=(-r_9)=3030$ | $d_2=d_8=85$ |
| $r_3=(-r_8)=3134$ | $d_3=d_7=275$ |
| $r_4=(-r_7)=4475$ | $d_4=d_6=3.7$ |
| $r_5=(-r_6)=67.438$ | $d_5=7.1$ |
| $n_1=n_6=1.717$ | $V_1=V_6=47.9$ |
| $n_2=n_5=1.62588$ | $V_2=V_5=35.6$ |
| $n_3=n_4=1.68578$ | $V_3=V_4=44.0$ |

Figure 2:
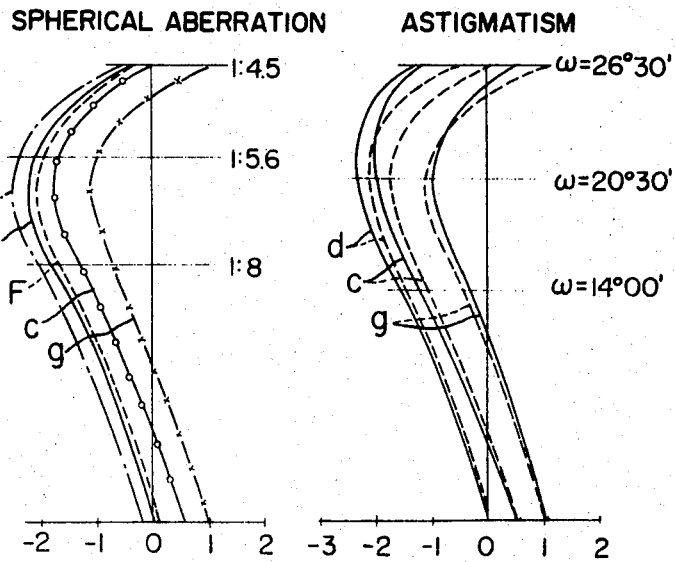
FIG. 2 is a graph illustrating aberration curves when an object is focused through the above lens system with a unity magnification.

It is seen from FIG. 2, aberration curves, that both of the spherical aberration and astigmatism are well-corrected from $c$-line (656.3 m$\mu$) to $g$-line (435.8 m$\mu$), so that a better image is obtained upon a copy paper which is photosensitive to the spectrum within this range.

Figure 3:
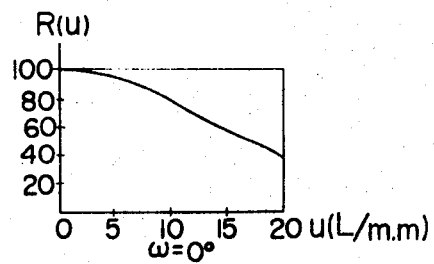
FIG. 3 illustrates OTF curves at the best image plane under the same condition described above.
Figure 3:
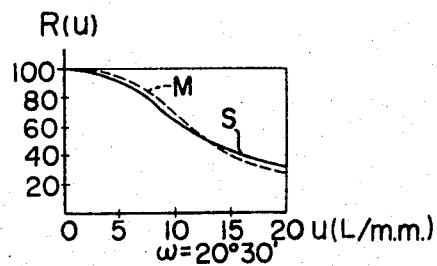
Figure 3:
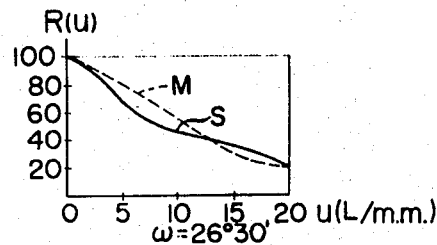

OTF curves of the instant embodiment at the best image plane obtained by the spot diagrams traced by $d$-line are shown in FIG. 3. The response R($u$) is plotted along the ordinate and the frequency of space $u$ (lines/mm.) is plotted along the abscissa.

$\omega$ designates one-half of a field angle with constant magnification; M, a meridional plane; and S, a sagital plane. Since when the response R($u$) is less than 30 percent, the frequency of space $u$ is almost corresponding to the power of resolution of the lens, it is seen that the resolution is advantageously 20 lines/mm. in the whole image plan. The fact that the difference between M and S is exceedingly small means less coma. A higher value of R($u$) at low frequency means less coma flare and sufficient contrast.

I claim:

1. A holosymmetrical photocopying lens system for use with a unit magnification comprising six individual lenses in four groups satisfying the following conditions:
aperture ratio: 1:4.5
field angle: 53°
$r_1=(-r_{10})=0.284724f$
$r_2=(-r_9)=2.017807f$
$r_3=(-r_8)=0.208707f$
$r_4=(-r_7)=0.298009f$
$r_5=(-r_6)=0.449099f$
$d_1=d_9=0.038625f$
$d_2=d_8=0.056605f$
$d_3=d_7=0.0183130f$
$d_4=d_6=0.024640f$
$d_5=0.047282f$
$n_1=n_6=1.717$
$n_2=n_5=1.62588$
$n_3=n_4=1.68578$
$V_1=V_6=47.9$
$V_2=V_5=35.6$
$V_3=V_4=44.0$ where
$r$ with a numerical subscript is a radius of curvature of a surface of a lens in the order of numerals from the first lens facing an object to be reproduced;

$d$ with a numerical subscript is a distance or thickness along the optical axis of said lens system of a lens or airspace between adjacent lenses in the order of numerals from said first lens;

$n$ with a numerical subscript is a refractive index by $d$-line of a lens in the order of numerals from said first lens; and $v$ with a numerical subscript is an Abbe number of a lens in the order of numerals from said first lens.